United States Patent [19]

Clarke

[11] Patent Number: 4,917,050

[45] Date of Patent: Apr. 17, 1990

[54] BIRDFEEDER

[75] Inventor: Stephen G. Clarke, Coventry, Conn.

[73] Assignee: M H Industries, Inc., North Haven, Conn.

[21] Appl. No.: 217,835

[22] Filed: Jul. 12, 1988

[51] Int. Cl.$^4$ .............................................. A01K 39/01
[52] U.S. Cl. ..................................................... 119/52.3
[58] Field of Search ...................... 119/51 R, 52 R, 63

[56] References Cited

U.S. PATENT DOCUMENTS

| | | | |
|---|---|---|---|
| 3,117,554 | 1/1964 | Taylor | 119/51 R X |
| 4,102,308 | 7/1978 | Kilham | 119/52 R |
| 4,331,104 | 5/1982 | Clarke | 119/51 R X |
| 4,355,597 | 10/1982 | Blasbalg | 119/51 R |

Primary Examiner—Robert P. Swiatek
Attorney, Agent, or Firm—Richard A. Craig

[57] ABSTRACT

A birdfeeder has a bottom portion for delivering seed to a tray to which birds have access through a fly up entry into a feeding area. The bottom portion includes a dome with a central hole and nearby filling port. There is also a cover with a central hole and a skirt portion which normally covers the filling port. The central holes define a birdfeeder axis. A hanger has a straight portion and a hook portion. The straight portion passes through the central holes and the hook portion is above the cover. An eccentric cover lock has an aperture through which the straight hanger portion passes. Due to its eccentricity, the cover lock is normally held by gravity in a cocked position in which the aperture impositively holds the cover lock at any location on the straight hanger portion above the cover including a lowermost location in which the skirt portion covers the filling port and the cover lock deters the raising of the cover. The feeder also has a spring device engageable with the hook portion and a mounting chain. The spring device suddenly lifts the bottom portion of the birdfeeder when an animal releases its grip on the straight hanger portion attempting thereby to reach the fly up entry.

5 Claims, 1 Drawing Sheet

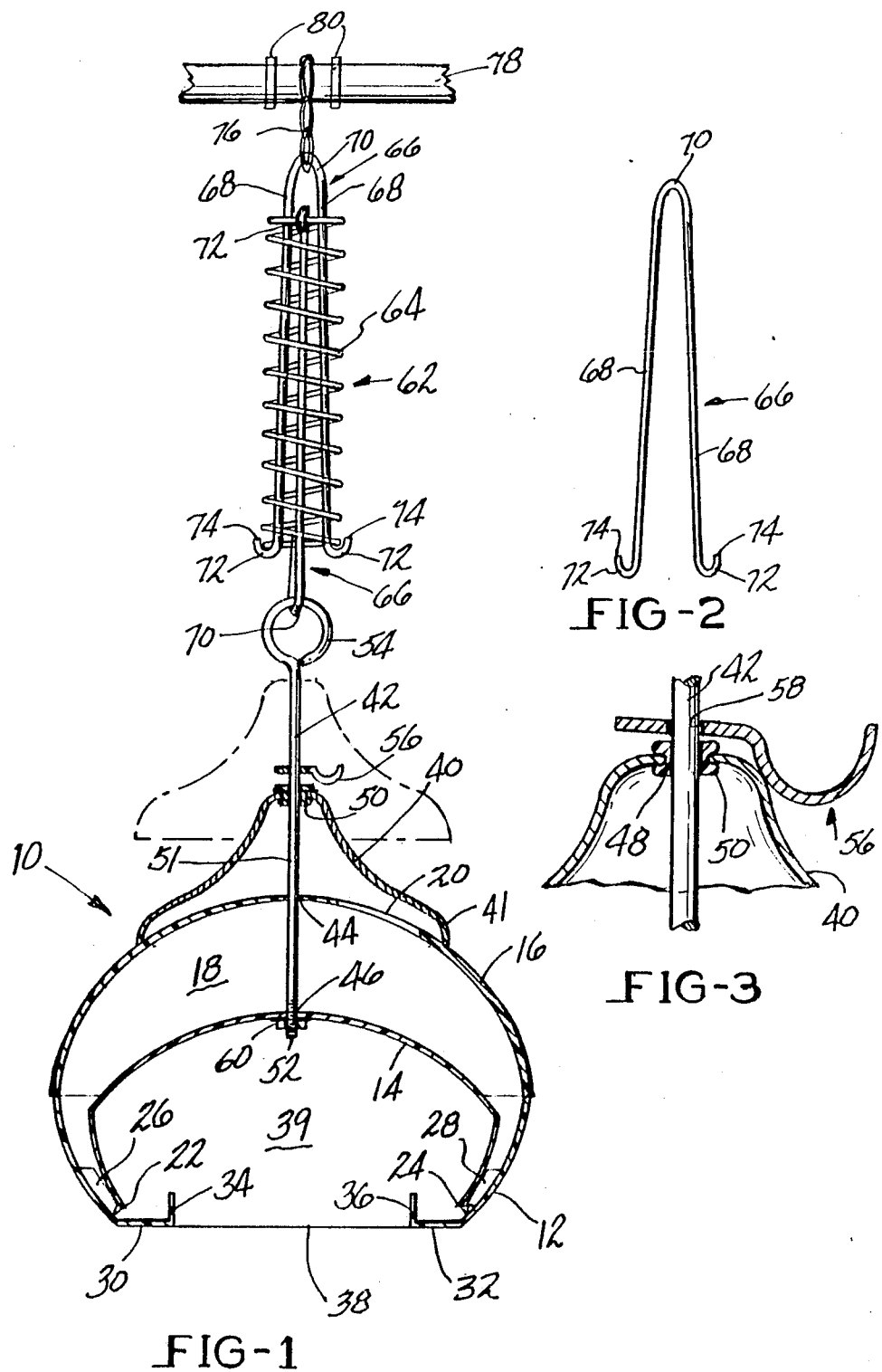

4,917,050

BIRDFEEDER

BACKGROUND OF THE INVENTION

This invention relates to an improved birdfeeder of the general type disclosed in my prior U.S. Pat. No. 4,331,104 granted May 25, 1982.

The birdfeeder of the aforesaid prior patent is particularly effective as a squirrel proof birdfeeder because of its overall geometry. The birdfeeder of the prior patent comprises a clear plastic body, a metal cover and a metal hanger. The body has an outer shell having upper and lower spherical wall portions and an inner arch having curved upper dome and lower wall portions, a pair of feeding trays, each having floor and sidewall portions and a bottom access opening or fly up entry. The upper wall portion has at least one filling port. The cover is bell-shaped with a central hole therethrough and is provided with a rubber grommet in seated engagement with the central hole. The hanger has a straight rod portion with external threads at one end and a hook portion at the other end. The grommet is in engagement with the straight rod portion of the hanger, and the cover is movable lengthwise of the rod portion between a lower position in which the cover covers the filling port and an upper position in which the filling port is exposed to permit seeds to be poured into the feeder. The rod passes through central aligned holes in the inner arch and the upper spherical wall portion. A nut is in threaded engagement with the threads on the hanger, and the hook portion of the hanger is a substantial distance above the hole in the upper spherical wall portion.

Squirrels will attempt to gain access to seed in the feeder by raising the cover to expose the filling port and/or by entering the feeder through the fly up entry.

The attempt by the squirrels to rise the cover is resisted by the grommet between the cover and the rod portion of the hanger, but eventually, due to grommet wear, this resistance tends to lessen until the squirrels may be successful in raising the cover and thereby getting at the seed in the feeder through the filling port.

In one of its features, it is an important object of the present invention to thwart squirrels' efforts to raise the cover to expose the filling port by providing a cover lock to resist raising of the cover to expose the filling port.

In attempting to gain access to seed in the feeder through the bottom access opening or fly up entry, a squirrel clings to the hanger by its hind legs, stretches its body around the cover and the body portion of the birdfeeder to the fullest possible extent and then releases its grip on the hanger and simultaneously tries to flip itself upwardly through the access opening, to grab a feeding tray. This is a precarious process involving an almost impossible feat of contortion and aerobatics.

It is another important object of the present invention to decrease the chances that a squirrel might gain access to the interior of the feeder through the fly up entry by providing a helper spring which causes the feeder to move suddenly upwardly when the squirrel releases its grip on the hanger, so that at the critical instant when the squirrel is flipping itself upwardly, the fly up entry is not where the squirrel thinks it is.

SUMMARY OF THE INVENTION

A birdfeed has a bottom or body portion for delivering seed to a feeding tray to which birds have access through a fly up entry into a feeding area. The bottom portion includes a dome with a central hole and a nearby filling port. There is also a cover with a central hole and a skirt portion which normally covers the filling port when the cover is in its lowest location. The central holes define the birdfeeder axis. A hanger has a straight portion and a hook portion. The straight portion passes through the central holes and the hook portion is above the cover. If the birdfeeder is properly mounted, squirrels have great difficulty gaining access to bird feed in the feeder. This invention heightens that difficulty.

In a first aspect, the invention provides an eccentric cover lock which has an aperture therethrough. The straight portion of the hanger passes through the aperture, and the cover lock is normally held by gravity in a cocked position in which the aperture engages the straight portion of the hanger to hold the cover lock at any location on the straight hanger portion above the cover including a lowermost location in which the skirt portion of the cover covers the filling port and an uppermost location in which the cover is liftable to expose the filling port. In its lowermost location, and in its normal cocked position, the cover lock deters raising of the cover.

In a second aspect, a helper spring device is provided. The helper spring device, which is preferably a drawbar assembly, is engageable with the hook portion of the hanger and with a mounting chain and functions to provide a sudden lifting of the body of the birdfeeder when an animal, particularly a squirrel, releases its grip on the straight hanger portion, in attempting thereby to gain access to the fly up entry.

The two aspects of the invention will provide maximum desired effect if used together, but substantial benefits are available from each aspect alone.

DESCRIPTION OF THE DRAWING

FIG. 1 is an axial sectional view of a birdfeeder embodying the invention in the installed condition showing the cover lock and the helper spring;

FIG. 2 is an elevational view of a component of the helper spring by itself; and FIG. 3 is an enlarged view of the cover lock, showing also the hanger and the cover fragmentarily.

DESCRIPTION OF THE INVENTION

FIG. 1 shows a birdfeeder 10 which is a preferred embodiment of the invention. Birdfeeder 10 includes a bottom or body portion comprising an assembly of three transparent plastic parts, namely, a bottom member 12, an inner arch 14 and a dome 16. Inner arch 14 is within top 16 and is secured thereto in known fashion. The assembly of inner arch 14 and dome 16 is assembled with bottom number 12 and secured thereto in known fashion. The space between inner arch 14 and dome 16 provides a seed reservoir 18. Dome 16 has near its axis a feed filling port 20 therethrough. Inner arch 14 has lower free ends 22 and 24 which are held in spaced relation to bottom 12 by chute supports 26 and 28 integral with bottom 12, and bottom 12 further has coplanar floors or birdfeeding trays 30 and 32 which are spaced below lower free ends 22 and 24, respectively, of inner arch 14. Walls 34 and 36 extend upwardly from the inner edges of floors 30 and 32, respectively, and are spaced inwardly from free ends 22 and 24 of inner arch 14. Walls 34 and 36 are spaced from each other and the space therebetween provides a fly up entry 38 into a feeding area 39 whereby birds can enter birdfeeder 10, perch on the tops of walls 34 and 36 and eat seeds on trays 30 and 32. As this happens, new seed proceeds by gravity from reservoir 18 to trays 30 and 32.

Birdfeeder 10 also includes a bell shaped metallic (aluminium) cover 40 with a skirt portion 41 and a metallic (cadmium plated steel) hanger 42. Dome 16 has axial hole 44 therethrough and inner arch 14 has a hole 46 therethrough, spaced from and aligned with hole 44. Likewise, cover 40 has a hole 48 therethrough, containing a rubber grommet 50.

Hanger 42, which is made of an aluminium rod about 0.25 inch (0.635 cm.) in diameter, has a straight portion 51 with external threads 52 at one end and a hook portion 54 at the other end.

Birdfeeder 10 further comprises as a first feature of the present invention a cover lock 56, which is a metallic member having a hole 58 therethrough, best seen in FIG. 3. Hole 58 may conveniently be round, but it is not necessarily so, and its ends have sharp corners. Cover lock 58 is eccentric with respect to hole 58, and as shown but not necessarily, cover lock 56 is in the form of a hook-like part. It is identified as "½ EMI" and hole 58 has a diameter of about 0.256 inch (0.65 cm.), slightly larger than the diameter of the rod comprising hanger 42. By "eccentric" is meant that the center of gravity of cover lock 56 is spaced laterally from hole 58.

Cover lock 56 could assume other forms, as long as it is eccentric with respect to its hole, and its hole has transverse dimensions slightly greater than the transverse dimension of straight portion 51 of hanger 42, so that in its normal, slightly cocked position shown in FIG. 3, it will resist movement lengthwise of hanger 42, but it is easily uncocked and so moved when desired. Cover lock 56 is shown in its uncocked position in FIG. 1.

The assembly of birdfeeder 10 is completed by passing the end of hanger 42 having threads 52 in either direction through hole 58 of cover lock 56 and then through and into snugly sliding fit with grommet 50 and then through hole 44 in top 16 and then through hole 46 in inner arch 14. A hex locking nut 60 is applied to threads 52, with a metal washer (not shown) and a rubber washer (not shown) between nut 60 and inner arch 14.

Straight portion 51 of hanger 42 is of substantially greater length than the distance between hole 46 through inner arch 14 and grommet 50 when the bottom of cover 40 is resting on dome 16, so that cover 40 can be raised on hanger 42 a sufficient distance to expose filling port 20 for easy use.

Attempts by squirrels to gain access to reservoir 18 through filling port 20, which is normally covered by skirt portion 41 of cover 40, by raising cover 40, will be thwarted by the normal cocked position of cover lock 56 as shown in FIG. 3, since cover lock 56 can not be raised straight upwardly while cocked. Yet it is a simple matter for a person to grasp the eccentric portion of cover lock 56 to pivot the portion of cover lock 56 containing hole 58 to a horizontal position and then raise cover lock 56 toward hook portion 54 of hanger 42 to expose filling port 20 to permit filling reservoir 18 with seed by pouring the same into filling port 20. Cover 40 and cover lock 56 are then lowered to the positions shown in FIG. 1., and cover lock 56 again assumes its cocked position.

Also shown in FIG. 1 is an additional feature of the present invention, sometimes referred to herein as a helper spring. FIG. 1 depicts the helper spring as a drawbar assembly 62 comprising a coil spring 64 and two hook members 66.

Each hook member 66, as illustrated in FIG. 2, is of one piece and is formed of spring wire stock, having leg portions 68 joined at one end by a bight portion 70 and having outwardly formed hook portions 72 at the ends of leg portions 68 remote from bight portion 70 and terminating at free ends 74 spaced outwardly from leg portions 68. Leg portions 68 are springy toward and away from each other, an hook member 66 is symmetrical about a line bisecting the angle between leg portions 68. Hook members 66 are assembled with spring 64 from opposite ends thereof, so that a bight portion 70 protrudes from each end of spring 64 and hook portions 72 of each hook member 66 are hooked around the end of spring 64 remote from bight portion 70 of that hook member 66.

Drawbar assembly 62 is shown with hook portion 54 of hanger 42 passing through bight portion 70 of one hook member 66 and with a chain 76 passing through bight portion 70 of the other hook member 66. Chain 76 passes over a sturdy horizontal support member 78 and is held in place thereon in any suitable manner, as by retainers 80. As shown but not necessarily, chain furnishes the immediate support for birdfeeder.

The weight of the inanimate items suspended from drawbar assembly 62 causes resilient elongation thereof which resilient elongation is increased substantially when an animal, particularly a squirrel, adds its weight to such items. When a squirrel attempts to gain access to the seed in birdfeeder by entering fly up entry 38, the squirrel clings by its hind legs to hanger 42, stretches its body around cover 40 and the body portion of feeder 10 to the fullest possible extent and then releases its grip on hanger 42 and simultaneously tries to flip itself upwardly through access opening or fly up entry 38. However, as soon as the squirrel releases its grip on hanger 42, drawbar assembly 62 will suddenly shorten, lifting fly up entry 38 away from the position where the squirrel thinks it is and thwarting the squirrel's efforts.

The two features of the present invention, namely, cover lock 56 and drawbar assembly or helper spring 62 can be used together to obtain maximum benefit or either can be used without the other to obtain a substantial benefit but less than maximum benefit.

It is apparent that the invention achieves the foregoing stated objects and advantages and others.

The disclosed details are exemplary only and are not to be taken as limitations on the invention except as those details are included in the appended claims.

What is claimed is:

1. A birdfeeder comprising a bottom portion for containing and delivering seed to a birdfeeding tray to which birds have access through a fly up entry into a feeding area, said bottom portion including a dome having a central hole therethrough and a filling port in close proximity to said central hole, said birdfeeder further including a cover having a central hole therethrough and a skirt portion which normally covers said filling port, and a hanger having a straight portion of predetermined diameter and a hook portion spaced above said cover, said straight portion passing through said central holes, and an eccentric cover lock on said straight portion of said hanger between said cover and said hook portion and having an aperture therethrough through which the straight portion of said hanger passes, said cover lock due to its eccentricity being normally held by gravity in a cocked position in which said aperture engages the straight portion of said hanger to hold said cover lock at any location along the straight portion of said hanger above the cover, including a lowermost location in which said skirt portion covers said filling port and said cover lock engages said cover to deter the raising thereof.

2. A birdfeeder according to claim 1 wherein said aperture in said cover lock is circular.

3. A birdfeeder according to claim 2 wherein the diameter of the straight portion of said hanger is about 0.25 inch (0.635 cm.) and the diameter of said aperture is about 0.256 inch (0.65 cm.).

4. A birdfeeder according to claim 1 further comprising resilient means engageable with said hook portion of said hanger for suddenly lifting said bottom portion of said birdfeeder when an animal releases its grip on the straight portion of said hanger while attempting to reach said fly up entry.

5. A birdfeeder comprising a bottom portion for containing and delivering seed to a birdfeeding tray to which birds have access through a fly up entry into a feeding area, said bottom portion including a dome having a central hole therethrough and a filling port in close proximity to said central hole, said birdfeeder further including a cover having a central hole therethrough and a skirt portion which normally covers said filling port and a hanger having a straight portion passing through said central holes and a hook portion spaced above said cover, and resilient means engageable with said hook portion of said hanger for suddenly lifting the bottom portion of said birdfeeder when an animal releases its grip on the straight portion of the hanger while attempting to reach said fly up entry, said resilient means being a drawbar assembly including a coil spring and first and second hook members of spring wire stock each having two leg portions joined by a bight portion and outwardly formed hook portions at the ends of said leg portions remote from said bight portion and terminating at free ends spaced outwardly from said leg portions, said hook members being capable of assembly with said coil spring from opposite ends thereof with said bight portions protruding from opposite ends of said coil spring and with said leg portions passing lengthwise through said coil spring and with said hook portions of each said hook member hooked around an end of said coil spring, and with said bight portion of said first hook member passing through said hook portion of said hanger and with said bight portion of said second hook member traversing a support for said birdfeeder.

* * * * *